(12) United States Patent
Reichenbach et al.

(10) Patent No.: US 7,714,914 B2
(45) Date of Patent: May 11, 2010

(54) METHOD AND DEVICE FOR THE CORRECTION OF THE BRIGHTNESS OF A RAW IMAGE GENERATED BY A SENSOR MATRIX

(75) Inventors: Jürgen Reichenbach, Emmendingen (DE); Carl Joseph Hafner, Reute (DE); Ulrich Zwölfer, Kenzingen (DE)

(73) Assignee: Sick AG, Waldkirch/Breisgau (DE)

( * ) Notice: Subject to any disclaimer, the term of this patent is extended or adjusted under 35 U.S.C. 154(b) by 566 days.

(21) Appl. No.: 11/649,374

(22) Filed: Jan. 2, 2007

(65) Prior Publication Data

US 2007/0177019 A1 Aug. 2, 2007

(30) Foreign Application Priority Data

Jan. 25, 2006 (DE) .................. 10 2006 003 596

(51) Int. Cl.
  H04N 9/64 (2006.01)
  H04N 5/14 (2006.01)
  H04N 1/40 (2006.01)
  G06K 9/40 (2006.01)
(52) U.S. Cl. .................. 348/251; 348/673; 382/274; 358/461
(58) Field of Classification Search .................. 348/251, 348/673; 382/274; 358/461
  See application file for complete search history.

(56) References Cited

U.S. PATENT DOCUMENTS

| 4,343,021 | A | * | 8/1982 | Frame | 348/247 |
|---|---|---|---|---|---|
| 4,970,598 | A | * | 11/1990 | Vogel | 358/461 |
| 5,317,421 | A | * | 5/1994 | Ito | 358/464 |
| 5,644,409 | A | * | 7/1997 | Irie et al. | 358/461 |
| 5,818,523 | A | * | 10/1998 | Ban | 348/224.1 |
| 6,144,776 | A | | 11/2000 | Daidoh et al. | |
| 7,538,806 | B2 | * | 5/2009 | Kawakami et al. | 348/251 |
| 2002/0094131 | A1 | * | 7/2002 | Shirakawa | 382/274 |
| 2004/0156563 | A1 | | 8/2004 | Shiomi | |
| 2005/0041850 | A1 | | 2/2005 | Watkins et al. | |

FOREIGN PATENT DOCUMENTS

| EP | 1 227 669 A2 | 7/2002 |
|---|---|---|
| WO | WO2005/066893 | 7/2005 |

OTHER PUBLICATIONS

European Search Report Dated Mar. 6, 2007, Relating to European Patent Application No. 06025674.0.
Translation of the European Search Report Dated Mar. 6, 2007, Relating to European Patent Application No. 06025674.0.

* cited by examiner

*Primary Examiner*—David L Ometz
*Assistant Examiner*—Richard M Bemben

(57) ABSTRACT

The invention relates to a method for the correction of the brightness of a raw image generated by a sensor matrix, in which an intensity matching is carried out at picture elements defined by a line coordinate and a column coordinate and at least one intensity value. The intensity matching comprises the application to the intensity values of the picture elements to be corrected of two intensity corrections independent of one another, in dependence on the line coordinate, on the one hand, and in dependence on the column coordinate, on the other hand. The invention furthermore relates to an optoelectronic sensor comprising a correction device. This correction device is matched to carry out the initially described intensity matching.

19 Claims, 5 Drawing Sheets

METHOD AND DEVICE FOR THE CORRECTION OF THE BRIGHTNESS OF A RAW IMAGE GENERATED BY A SENSOR MATRIX

CROSS-REFERENCE TO RELATED APPLICATIONS

This application claims the benefit of German Patent Application No. 10 2006 003 596.8, filed Jan. 25, 2006. The disclosure of the above application is incorporated herein by reference.

FIELD

The invention relates to a method and to a device for the correction of the brightness of a raw image generated by a sensor matrix.

BACKGROUND

The statements in this section merely provide background information related to the present disclosure and may not constitute prior art.

It is frequently observed with raw images of this type that the image brightness in the marginal regions of the raw image is lower than in the center, although a homogeneous image brightness would be expected. A non-uniform brightness distribution is above all observed when the raw images were taken under oblique light incidence and/or an oblique taking angle.

Further factors can also be responsible for the named inhomogeneities in addition to an oblique light incidence and/or an oblique taking angle. Color filters e.g., which are disposed in front of a sensor matrix, can thus have angle-dependent characteristics. Furthermore, brightness drops in the marginal regions of a raw image—or very generally brightness inhomogeneities—are, however, also caused by imaging errors of an optical receiving system of the sensor. Finally, an inhomogeneous illumination of a surface to be observed can also be the cause for artifacts.

Artifacts of this type, which are caused by the sensor itself, by lighting devices or by distortion in the beam path of the received light, represent a not insubstantial interference factor. In particular with an optical detection of codes (e.g. for the identification of articles) by optoelectronic sensors or cameras, such parasitic inhomogeneities are irritating since they make error-free code recognition more difficult. It is known to avoid this problem to remove the named artifacts largely again by a suitable brightness correction (flat field correction).

Generally, flat field corrections are known for the compensation of deviating image brightness in the marginal region of an image. US 2005/0041850 A1, for example, describes a quality inspection system for wafers using a camera, with a flat field correction being carried out—in addition to other corrections—on the image taken by the camera. The effect of an angular incidence of an illumination light should be taken into account with the correction described. In this connection, a two-dimensional matrix of correction values k(x, y) are applied to the brightness values (intensity values) of the picture elements of the taken raw image. For this reason, just as many correction values as picture elements are required for this process. With a sensor which comprises 1280 picture elements in one direction (e.g. x direction) and 1024 picture elements in a direction perpendicular thereto (e.g. y direction), somewhat more than 1.3 million correction values therefore result, for example. Carrying out such a correction thus requires substantial memory space. The carrying out of the plurality of required computation operations and the accesses to the memory associated therewith are moreover very time-intensive.

However, it is particularly the time factor which is of particular importance for many applications. It is moreover desirable for a brightness-correcting process to be able to be carried out with electronic components which are as simple and therefore as cost-effective as possible.

SUMMARY

It is therefore the underlying object of the invention to provide a fast method for the correction of the brightness of a raw image generated by a sensor matrix which permits a simple and efficient brightness correction. The method should additionally take up as few memory and computation resources as possible.

This object is satisfied in particular in that, on an intensity matching to the intensity values of the picture elements to be corrected, two intensity corrections which are independent of one another are used, on the one hand in dependence on the line coordinate and, on the other hand, in dependence on the column coordinate of the individual picture elements.

The method in accordance with the invention therefore serves for the correction of the brightness of images which have an inhomogeneous brightness distribution, in particular in the marginal regions, due to different effects, for example based on artifacts, due to the optical receiving system, the sensor matrix, and/or angular taking and/or lighting geometries. The picture elements of a raw image generated by a sensor matrix are defined by a line coordinate (e.g. in the x direction) and a column coordinate (y direction) and at least one intensity value i(x, y). In accordance with the invention, an intensity matching is carried out at at least some of these picture elements, preferably at all picture elements, with two intensity corrections being used on the intensity values of the picture elements to be corrected. These two intensity corrections, which can be carried out simultaneously or sequentially, are independent of one another. The intensity values of the picture elements are namely corrected, on the one hand, in dependence on their respective line coordinates—and independently of their respective column coordinate—and, on the other hand, in dependence on their respective column coordinate—and independently of their respective line coordinate. Substantially fewer correction coefficients are needed for a correction method of this type than with the conventional methods which use a complete correction matrix in which each individual correction value is dependent both on a line coordinate and on a column coordinate. In the aforesaid example of a sensor matrix with 1280×1024 picture elements (pixels), only approximately 2,300 correction values are needed in the method in accordance with the invention. In sensors with more pixels, the difference in required correction values between the conventional matrix correction methods and the correction method in accordance with the invention is even much clearer.

Only the storage of two one-dimensional correction value arrays as well as the addressing of the picture elements each having a line index or a column index is necessary in the method in accordance with the invention due to the splitting of the correction matrix k(x, y) into separate correction functions f (with the line-dependent correction values f(x)) and g (with the column dependent correction values g(y)). The correction values can be stored, for example, in a look-up table in the working memory of a processor due to their comparatively low number, which substantially reduces the number of the required accesses to external memories with respect to known correction methods. The method in accordance with the invention therefore represents a substantial simplification in contrast with the conventional methods and can therefore also be realized with a comparatively low hardware effort in real time, i.e. in signal flow and in the pixel cycle. An image memory is therefore only necessary after carrying out the flat field correction in accordance with the invention, e.g. to be able to carry out a software-assisted code recognition method on the basis of the corrected images.

The method in accordance with the invention can be implemented with simple, freely programmable logic components, so-called field programmable gate arrays (FPGAs) and/or application-specific circuits, so-called application specific integrated circuits (ASICs). In comparison with the more complex conventional methods, this makes a much more cost effective design of a correction electronic system possible.

In accordance with a preferred embodiment, the intensity matching is only carried out in specific regions of the raw image. In particular the marginal regions of the raw image, which usually have brightness drop, are of particular significance in this process. Due to the reduction of the region to be corrected, the number of the correction values used and/or the number of the calculation operations to be carried out can be further reduced and the method can then be simplified advantageously and thus accelerated.

In accordance with a further development of the invention, precisely one intensity value, which represents a gray value in this case, is associated with each picture element. In an alternative embodiment, a plurality of intensity values is associated with each picture element. These intensity values correspond to the intensity of the respective color channel of the sensor matrix. This is usually a case of three color channels. Depending on the conditions of the application environment, the properties of the surfaces observed and/or the complexity of the task, monochrome or also color cameras can thus be used.

The intensity matching can be carried out for one or also for more color channels. Provision is also made for all color channels to be taken into account in the intensity matching, whereby the image data of all channels are advantageously corrected and can thus be used, for example, for a code recognition.

It is preferred for an intensity correction to be realized by a multiplication or a summing between an intensity value and a correction value. Since the intensity matching in accordance with the invention consists of two intensity corrections independent of one another, the product or the sum is formed from the respective intensity value, from a correction value $f(x)$ dependent on the line coordinate, and from a correction value $g(y)$ dependent on the column coordinate. This can also be represented, for example, in the equations $o(x, y)=i(x, y)*f(x)*g(y)$ or $o(x, y)=i(x, y)+f(x)+g(y)$, where $i(x, y)$ are the intensity values of the picture elements of the raw image and $o(x, y)$ is the intensity value of the picture elements after the intensity matching. It is understood that the correction values $f(x)$, $g(y)$ can also be negative.

If $f(x)=1$ is set for all x or $g(y)=1$ for all y, the method can also be used on line sensors (line cameras).

Linear corrections of this type based on additions or multiplications make use of relatively few and simple calculating operations and can therefore be carried out with less computing effort in comparison with non-linear corrections.

In accordance with a preferred embodiment, the correction values $f(x)$, $g(y)$ are not only dependent on the line coordinate and column coordinate, but also on the color channel on whose intensity value they are used. A different correction can thus be carried out on e.g. a red color channel than on a green color channel in order, for instance, to compensate the effect of a dominant color of the ambient light or also to counter imaging errors of the optical receiving system dependent on the wavelength of the light (chromatic aberration).

The correction values are advantageously also dependent on the geometric arrangement of the camera with respect to an observation surface. The intensity distribution is strongly influenced in a raw image due to these geometric effects alone. By the taking into account of the taking angle of a raw image, that is of the angle between the optical axis of the sensor and/or of the optical receiving system in general and the surface observed, different correction values $f(x)$, $g(y)$ of the correction functions f, g result than in a perpendicular taking position. An alternative embodiment takes account of the influence of a lighting angle on the intensity distribution of a raw image, i.e. the corrections values $f(x)$, $f(y)$ are dependent on the angle between the illuminated light and the observed surface. A further embodiment comprises the two aforesaid embodiments, i.e. the correction values $f(x)$, $f(y)$ are dependent both on the taking angle of the raw image and on the lighting angle of the raw image.

Due to the taking into account of the taking angle effect and the lighting angle effect, images can be corrected which are taken with the most varied camera and lighting arrangements. The geometrical requirements are frequently predetermined by the construction constraints of the use environment. A method for the intensity correction which compensates disadvantageous taking and lighting angle effects of this type substantially expands the application possibilities of a given optoelectronic sensor.

Provision can furthermore be made to adapt the correction values used in the intensity matching to the reflection properties of an observation surface or of an observation article. The influence of, for example, matt surfaces, metallic surfaces or shining surfaces can thus be taken into account in the intensity matching. The effects of surfaces having regions of different reflection properties can also be taken into account by suitable correction values.

It is furthermore preferred for the correction values used to be determined ex works or, however, also only on site, i.e. at the site of the intended use of the unit which implements the method. It can thus be ensured that the apparatus characteristics are compensated as much as possible by individually adapted correction values. The determination of the correction values can take place by teaching processes. A teaching process for the renewed determination of the correction values can be necessary when individual elements of an optoelectronic sensor arrangement which the method in accordance with the invention uses are replaced or when their geometrical arrangement is changed.

It is of advantage if constant offset values are added to the intensity values of the picture elements in addition to the intensity corrections. This can take place before and/or after the individual intensity corrections. Images which, for example, are too light or too dark can be darkened or brightened uniformly by these matching processes independent of the position of the picture element to prepare image processing processes following later. Specific color channels can also thus be generally weakened and/or amplified.

In accordance with an advantageous further development, these constant offset values, which can also be negative, are determined with reference to one or more teaching processes. Further possibilities thereby result to compensate the specific construction properties of a sensor arrangement or influences of the ambient conditions.

It is furthermore preferred for the intensities o(x, y) of the picture elements of a raw image corrected by the intensity matching in accordance with the invention to be compared with reference-corrected intensities r(x, y) of the picture elements of the same raw image which were previously corrected with an optimized complete reference correction matrix in which each correction value is dependent on a line coordinate and a column coordinate. This comparison produces a correction error in dependence on the degree of deviation of the image matched in intensity in accordance with the invention from the reference-corrected image. Specifically, a reference object, a white surface for example, can be taken beforehand and a reference correction matrix can be determined with reference to the raw image obtained whose application onto the raw image obtained again produces a white surface. The values of the reference correction matrix are consequently selected so that the raw image thus corrected matches the taken white surface as much as possible. Subsequently to this, any other desired image can be taken which is processed by the complete reference correction matrix, on the one hand, and is corrected with the intensity corrections f(x) and g(y), on the other hand. A correction error results from the difference between the two images.

Provision can furthermore be made for the correction error to be determined from a direct comparison of the correction values f(x), g(y) with the above-described reference correction values r(x, y) of the reference correction matrix. In this case, the taking of the aforesaid "any other desired" image is not necessary.

Both methods for the determination of the correction error can be implemented simply. It is possible with reference to this correction error to determine the quality of the corrections made and, optionally, to emit a warning or to take other measures, in particular to use better adapted correction values.

It is preferred for the correction values f(x), g(y) and/or the offset values to be matched such that the correction error is minimal. A high quality of the correction is thus ensured.

In accordance with an advantageous further development of the invention, the correction error is determined after the intensity matching. Subsequently, the correction values and/or the offset values are varied, with it being the aim to minimize the correction error. An iterative process, i.e. the carrying out of an intensity matching with a subsequent determination of the correction error and a corresponding change of the correction values for so long until a predefined correction quality is reached, can be implemented simply and can practically take place without the intervention of an operator either during an initializing phase or also during the use in practice.

A further development of the invention comprises the parallel carrying out of a plurality of intensity matching procedures on a raw image with different sets of correction values (e.g. f1(x), g1(y); f2(x), g2(y); . . . or f1(x), g1(y); f1(x), g2(y); . . . ) Finally, a correction value is determined for each of these corrected images. The correction value set associated with the lowest correction error is selected as the correction value set coming closest to the reference correction and thus as the best suitable correction value set.

The methods described above for the selection of a correction value set with minimal correction error are in particular of importance for teaching processes. If a correction value set has been determined with minimal correction error, the teaching process is ended and the correction value set determined can be used in further operation. As already explained, it may be necessary to repeat teaching processes of this type under certain circumstances (teach-in).

It is furthermore preferred for further intensity corrections to be carried out after an intensity matching. This is of particular advantage if, for example, only specific regions should be corrected more exactly. Other regions which are e.g. of less importance or which have already been corrected sufficiently well can be excluded from a further intensity correction under certain circumstances.

The method in accordance with the invention thus permits a fast and reliable matching of the intensity of picture elements, whereby brightness artifacts due to construction effects or geometrical effects are largely removed. A plurality of pictures can also be taken sequentially of an observation object, in particular of a code, due to the speed of the process and the taking speed, which has become high in the meantime, of conventional sensors and can be corrected immediately, i.e. in real time. A code recognition can therefore be carried out with reference to a plurality of images of the same object for particularly safety-relevant applications, e.g. in code recognition in the pharmaceutical industry. In addition, the correction values can also be deliberately modified slightly to thus provide a wider image data base for the identification of the code. This can also be carried out in parallel, i.e. a plurality of different correction value sets are applied to one raw image. These corrected images produced in parallel are in turn used for the pattern recognition.

Provision can be made in both cases for a code only to be classified as recognized when it has been identified with reference to a plurality of images processed with different correction values or correction value sets. The reliability of a code recognition system is thus further improved.

The invention furthermore relates to an optoelectronic sensor comprising a sensor matrix, an optical receiving system and a correction device for the correction of the brightness of a raw image generated by the sensor matrix. In this connection, the correction device is adapted to carrying out a method in accordance with one of the embodiments described. An optoelectronic sensor having a correction device of this type delivers images which are of a high quality practically in real time which are flat-field corrected, i.e. such that intensity inhomogeneities due to unwanted artifacts are compensated.

Further advantageous embodiments of the invention are set forth in the dependent claims, in the description and in the drawings.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1 schematically shows an optoelectronic sensor in which the method in accordance with the invention can be used;

Figure 5A:
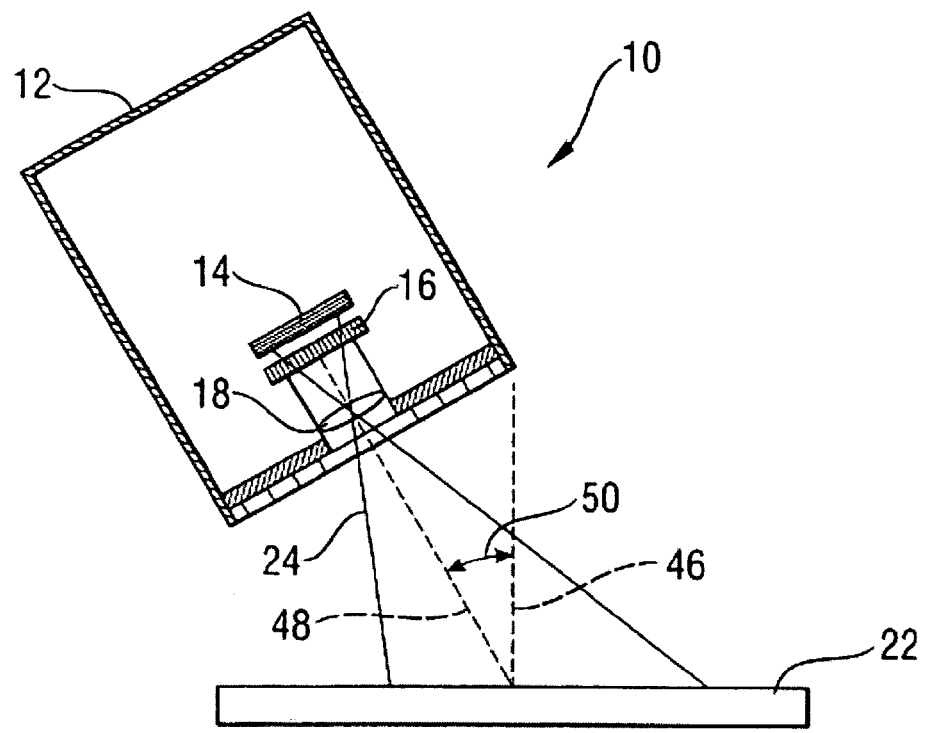
Figure 5B:
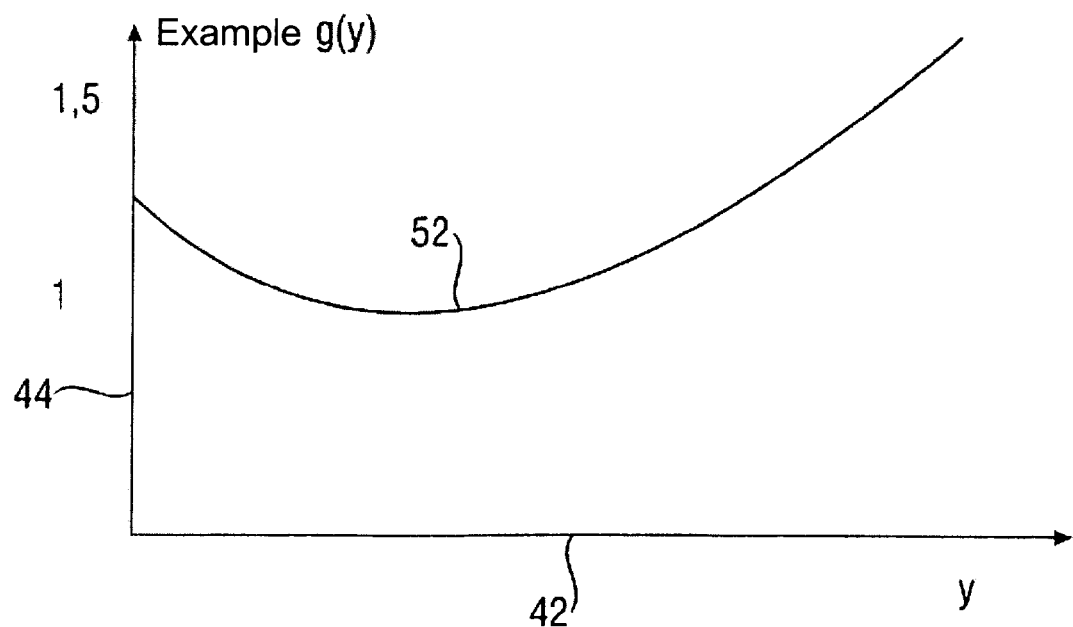
Figure 6:
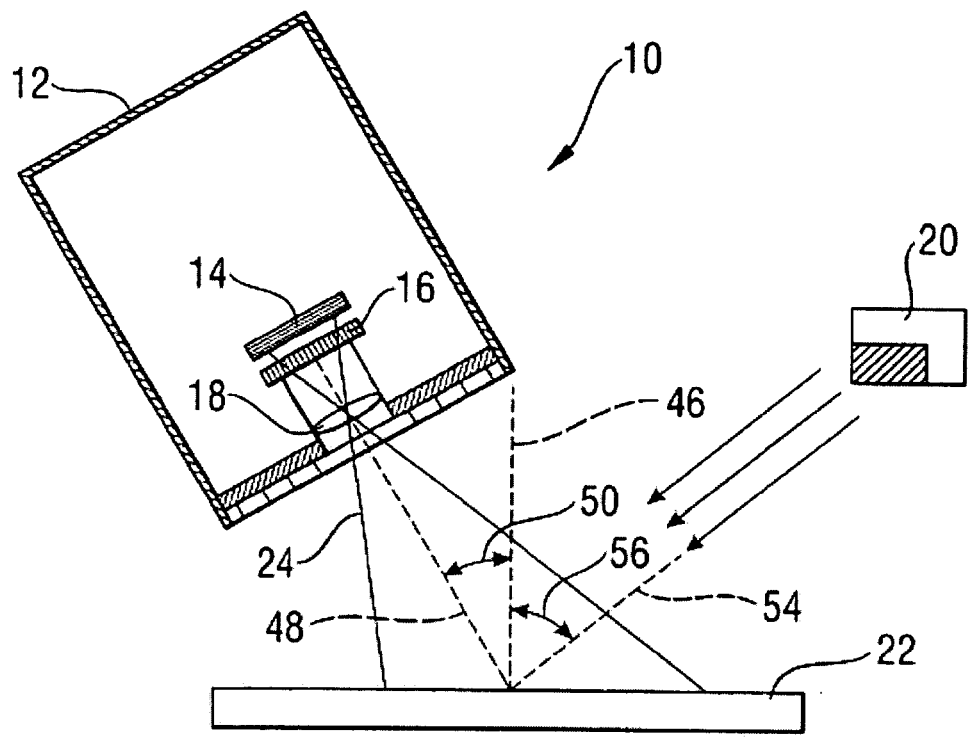
Figure 7:
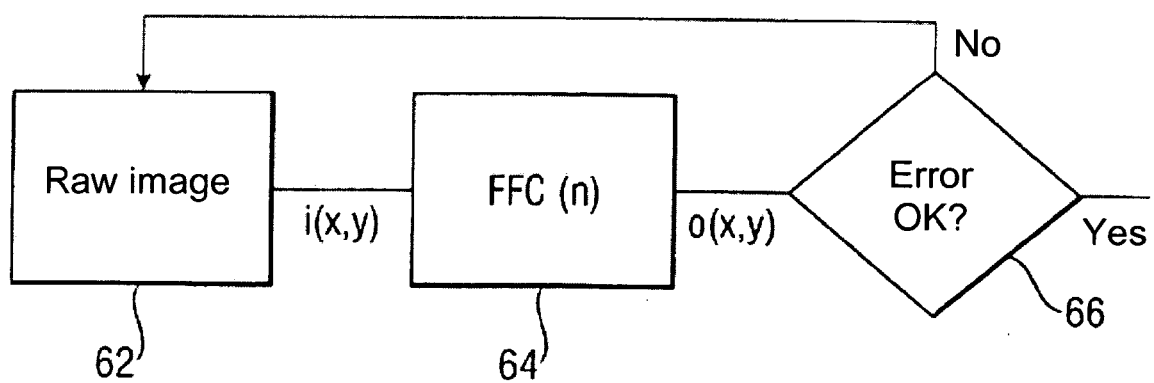
Figure 8:
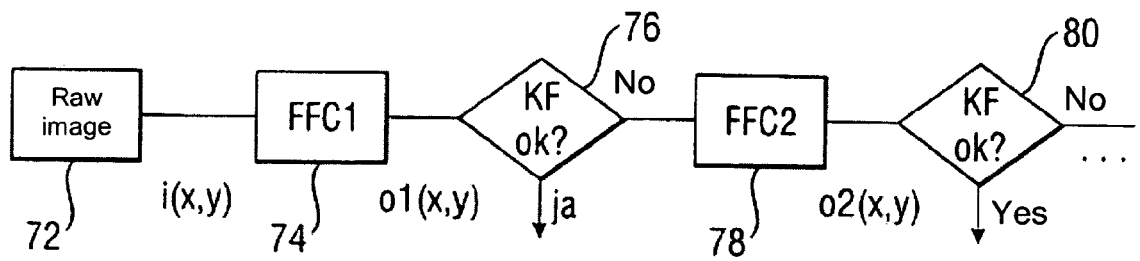
Figure 9:
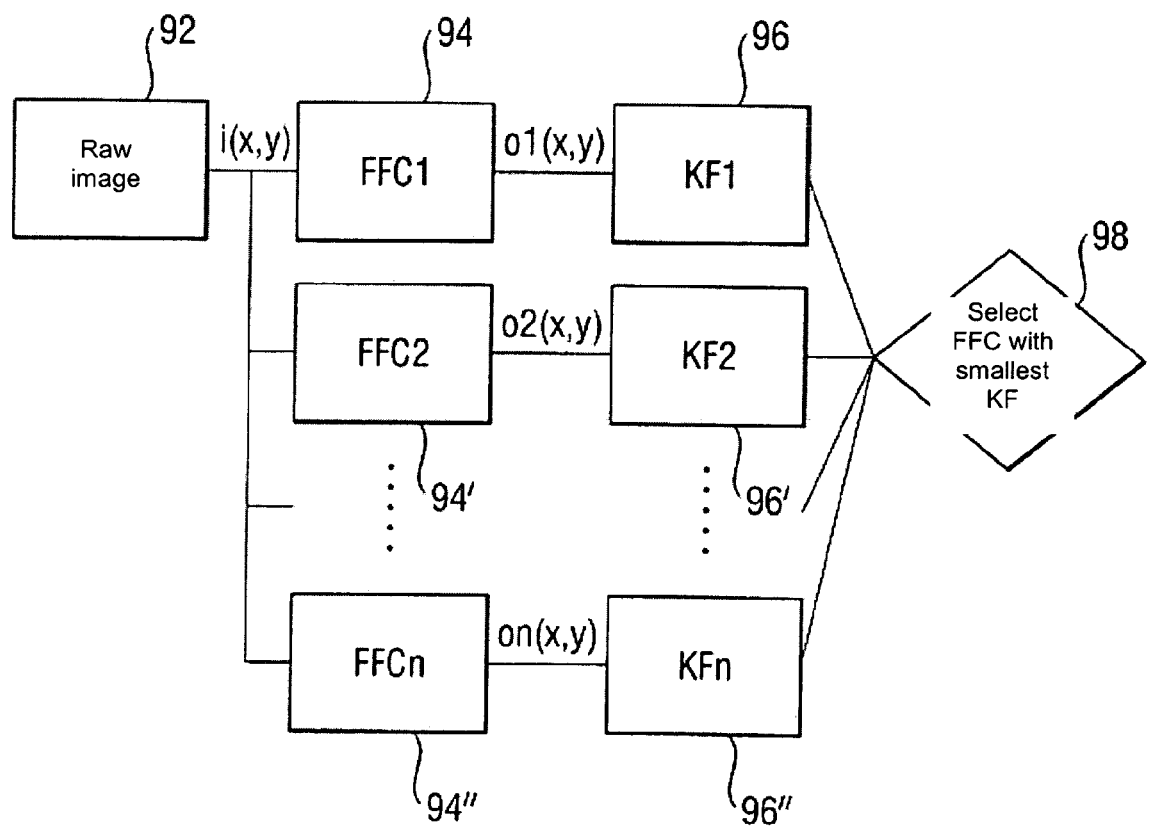

FIG. 5a schematically shows an optoelectronic sensor standing obliquely with respect to the observation surface;

FIG. 5b shows an example for a correction function g with an obliquely standing optoelectronic sensor (see FIG. 5a);

FIG. 6 shows an optoelectronic sensor standing perpendicular with respect to the observation surface having external illumination of the observation surface;

FIG. 7 shows a flow chart of an embodiment of an iterative teaching process for the determination of the correction values;

FIG. 8 shows a flow chart of a further embodiment of an interactive teaching process for the determination of the correction values;

FIG. 9 shows a flow chart of an embodiment for the determination of the correction values in a parallel process.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
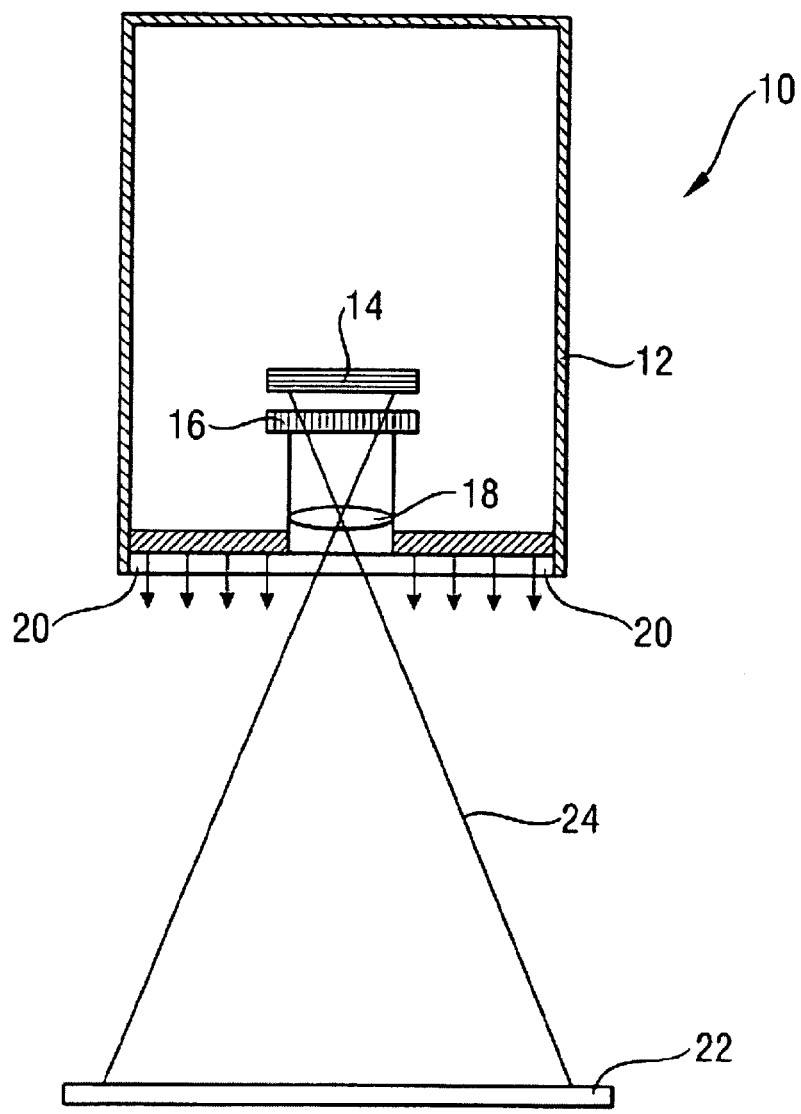

A camera is shown in FIG. 1 which comprises a camera housing 12, a matrix sensor 14, an optical color filter 16 and a lens 18. In this embodiment of the camera 10, the light source 20 for the illumination of an object 22 is integrated into the camera 10. Furthermore, the reception beam path 24 is sketched. The matrix sensor 14 delivers a two-dimensional image. For example, an image can comprise 1280 picture elements (pixels) in the x direction (here e.g. perpendicular to the plane of representation) and 1024 pixels in the y direction (here e.g. extending horizontally in the plane of representation).

Figure 2:
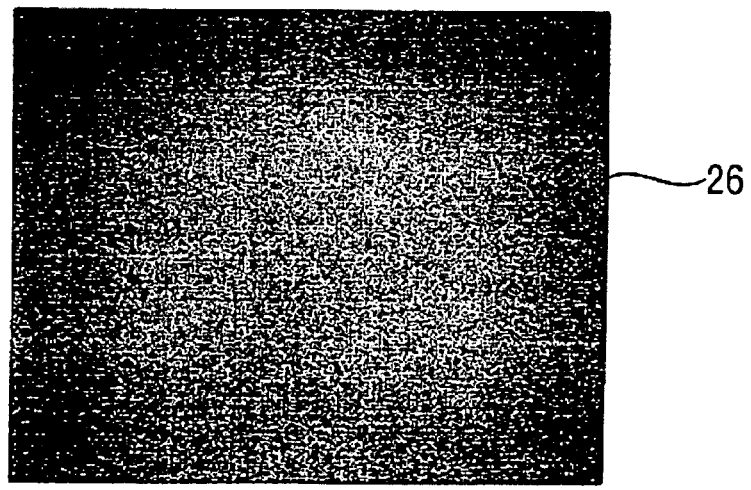
FIG. 2 shows the image of a surface with homogenous color distribution without flat field correction.

An image 26 taken by the matrix sensor 14 is shown in FIG. 2. This image 26 is the photo of a surface homogeneous with respect to its color and reflection properties and uniformly illuminated. The brightness drop can be clearly recognized above all in the marginal regions of the image 26. The brightness inhomogeneities are interfering artifacts which have to be corrected. As already initially described, effects of this type are e.g. due to angle-dependent influences of the lens 18, of the optical color filter 16 and of the matrix sensor 14. Furthermore, they can also be caused, for example, by oblique or inhomogeneous illumination.

Figure 3:
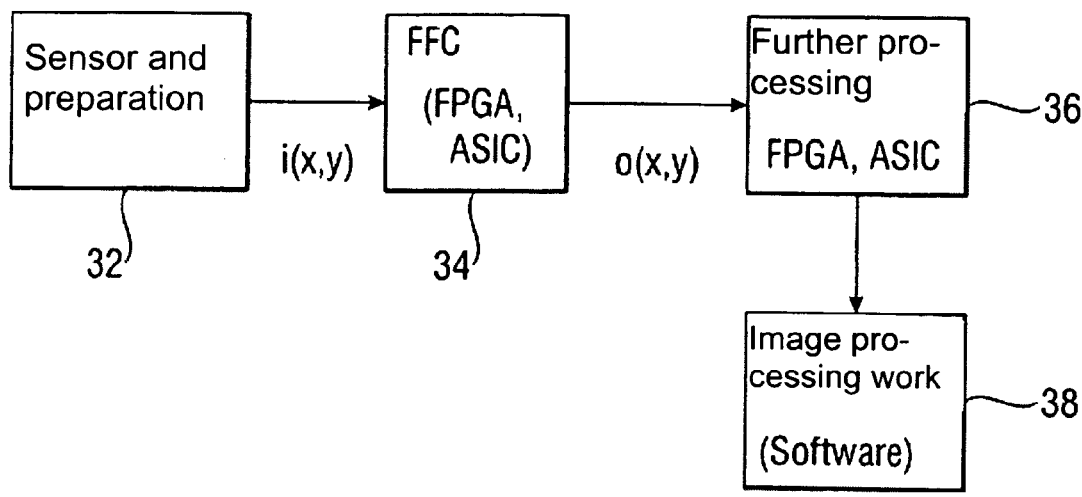
FIG. 3 shows a flow chart of a flat field correction.

The course of a flat field correction is shown in a flow chart in FIG. 3. The sensor data are prepared at step 32. The values i(x, y) of the raw image are defined by one or more intensity values and the spatial coordinates x and y. The flat field correction (FFC) takes place at step 34. This is carried out by FPGA (Field Programmable Gate Array) components and/or ASIC (Application Specific Integrated Circuit) components. The intensity matched image is now composed of picture elements having the intensity values o(x, y). Subsequently to this, an optionally required further processing of the image data takes place. The image processing, for example a pattern recognition, is carried out at step 38.

Figure 4:
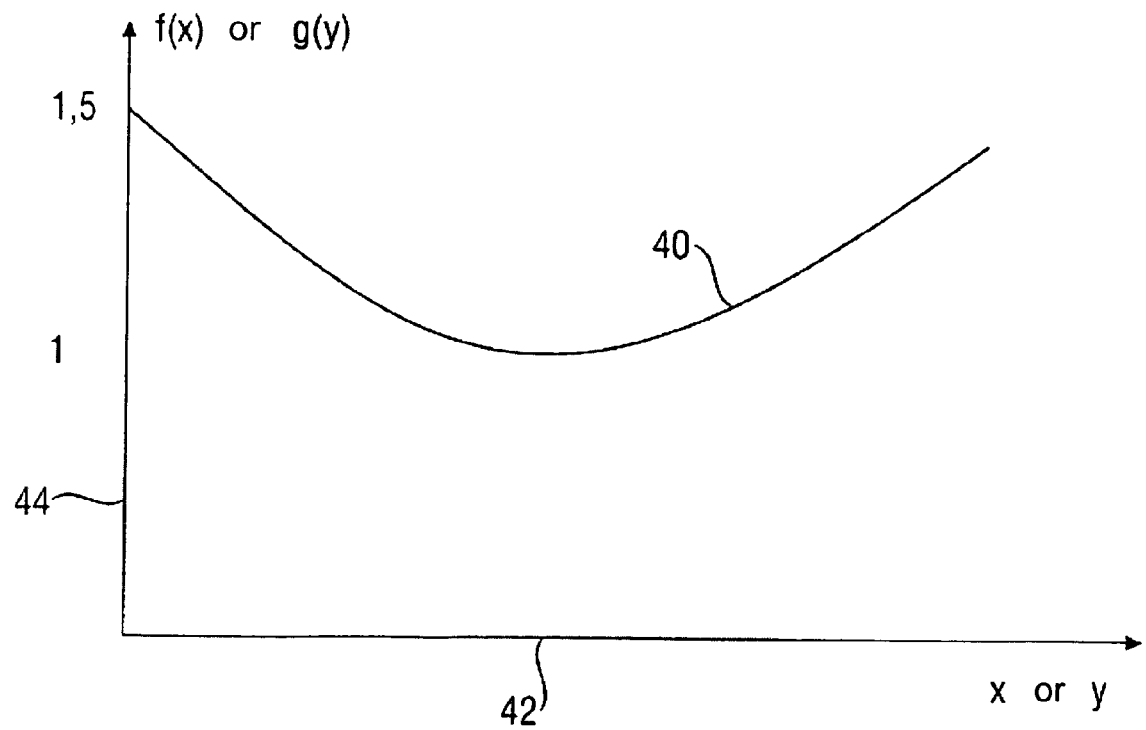
FIG. 4 shows a possible course of a correction function for or g in dependence on the position of the pixels.

FIG. 4 shows by way of example a correction function 40 such as can be used in the flat field correction in accordance with the invention at step 34 (FIG. 3). The correction function 40 represents the correction values f(x) and g(y) on the ordinate 44 in dependence on its position in the x direction or the y direction (abscissa 42). The correction function 40 shown has higher function values f(x) and g(y) in the marginal region to compensate a brightness drop at the margin. Other brightness inhomogeneities can be corrected by corresponding correction functions.

In practice, in this connection, a discrete correction value f(y) is associated with a discrete x value or a discrete correction value g(y) is associated with a discrete y value. These values can be stored in a table, for example. The method in accordance with the invention consequently carries out an efficient flat field correction with two one-dimensional correction functions. The correction in accordance with the invention is admittedly not quite so exact as conventional methods having a two-dimensional complete correction matrix. This slight disadvantage is, however, compensated by the speed of the correction in accordance with the invention. It is also not necessary to carry out a complete, exact correction in most applications.

FIG. 5 illustrates the geometrical conditions with an obliquely standing camera 10. The taking angle 50 is defined between the surface normal 46 of the object 22 and the optical axis 48 of the camera 10. A different brightness drop thereby arises in the marginal region of a raw image than with a camera 10 standing perpendicular over the object 22.

The taking angle correction function 52 in FIG. 5b takes account of the changed geometrical relationships of FIG. 5a with respect to the camera position shown in FIG. 1. The dependence of the correction values g(y) on the position values of the picture elements in the y direction is shown by way of example. In comparison with the correction function 40 in FIG. 4, the minimum of the taking angle correction function 52 is displaced to the left. The brightness inhomogeneities caused by the standing obliquely of the camera 10 can be largely eliminated by the taking angle correction function 52.

FIG. 6 shows a further variant of the taking relationships and lighting relationships. In contrast to FIG. 1, in this case the light source 20 is not integrated into the camera housing 12. A lighting angle 56 onto the surface of an object 22 is defined between a lighting axis 54 and the surface normal 46. The correction functions f, g in an arrangement of the camera 10 and of the light source 20 of this type is inter alia dependent not only on the taking angle 50, but also on the lighting angle 56.

As initially explained, the correction values can either be fixedly set or be determined in a teaching process, either ex works or on site. In FIG. 7, an embodiment of a teaching process of this type is shown in a flow chart. Starting from a raw image (step 62) having the intensity values i(x, y), a flat field correction (FFC) is carried out with reference to a correction value set (indicated y the running variable n) at step 64. The result of this correction o(x, y) is compared with a reference image and a correction error KF is determined at step 66. If this error is minimal or smaller than a predetermined threshold value, the teaching process is concluded and the last used correction value set (FFC(n)) is used for normal operation. Otherwise, the process starts again at step 62, with a different correction value set (FFC(n+1)) now being used at step 64.

The processes explained in the introduction to the description can be used for the determination of the correction error. An intensity difference can in particular be formed pixel-wise between the intensity-matched image obtained at step 64 and a reference value. The sum of the squared differences can be the correction error, for example.

FIG. 8 shows a flow chart of an alternative embodiment of a teaching process for the determination of suitable correction values. Again starting from a raw image (step 72), a correction (FFC1) is applied to the intensity values i(x, y) of the picture elements of a raw image in step 74. If the correction error is minimal or smaller than a predefined threshold value, the teaching process is concluded at step 76. The correction values of the correction value set FFC1 would furthermore be used in this case. If the error is considered too large, step 72 is not returned to, but a further correction (FFC2) is applied to the already corrected intensities o1(x, y) of the picture elements in step 78, whereby a new picture element set with the intensities o2(x, y) is obtained. The correction error is in turn determined at step 80.

The process is continued for so long until the error is minimal or a specific threshold value is fallen below. A procedure of this type for the determination of the suitable correction values is possible since the individual correction functions are linear images in the mathematical sense. A suitable flat field correction FFC can therefore be determined from the individual corrections FFC1 to FFCn.

FIG. 9 represents a further flow chart for the determination of suitable correction values by a teaching process. The raw image delivered at step 92 which consists of picture elements having the intensities i(x, y), is subjected in parallel to a plurality of flat field corrections with different correction value sets FFC1, FFC2, ... FFCn (steps 94, 94', ..., 94"). A plurality of picture element sets having the intensities o1(x, y), o2(x, y), ... on(x, y) result from this. Subsequently to this, the determination of the individual correction errors KF1, KF2, ... KFn takes place in the steps 96, 96', ..., 96". The correction value set for the further use which generates the lowest correction error KF is selected at step 98.

The description of the invention is merely exemplary in nature and, thus, variations that do not depart from the gist of the invention are intended to be within the scope of the invention. Such variations are not to be regarded as a departure from the spirit and scope of the invention.

REFERENCE NUMBER LIST

10 camera
12 camera housing
14 matrix sensor
16 optical color filter
18 lens
20 light source
22 object
24 receiving beam path
26 image
40 correction function
42 abscissa
44 ordinate
46 surface normal
48 optical axis
50 taking angle
52 taking angle correction function
54 lighting axis
56 lighting angle
FFC flat field correction
KF correction error

What is claimed is:

1. A method for the correction of the brightness of a raw image generated by a sensor matrix, comprising:
    executing an intensity matching at picture elements defined by a line coordinate and a column coordinate and at least one intensity value,
    wherein intensity values of the to be corrected picture elements are corrected using two intensity corrections that are independent of one another, the correction depending on the line coordinate, on the one hand, and depending on the column coordinate of the individual picture elements, on the other hand,
    wherein the intensity matching includes providing one of a product and a sum based on a respective intensity value, a correction value dependent on the line coordinate and a correction value dependent on the column coordinate, and
    wherein a correction error is determined by a comparison of a first image chanced by the intensity matching with a second image corrected by an optimized reference correction, with both images being derived from a common raw image.

2. A method in accordance with claim 1, wherein the intensity matching is only carried out for specific regions, in particular for the marginal regions of the raw image.

3. A method in accordance with claim 1, wherein precisely one intensity value is associated with each picture element and represents a gray value.

4. A method in accordance with claim 1, wherein two or more intensity values are associated with each picture element and each correspond to a color channel of the sensor matrix.

5. A method in accordance with claim 4, wherein an intensity matching takes place for at least one color channel.

6. A method in accordance with claim 1, wherein the correction values are dependent on the color channel on whose intensity values they are applied.

7. A method in accordance with claim 1, wherein the correction values are dependent on a taking angle of the raw image, with the taking angle, at the time of the production of the raw image, is the angle between one of a surface normal of the sensor matrix and the optical axis of an optical system associated with the sensor matrix, and a surface normal of an observation surface.

8. A method in accordance with claim 1, wherein the correction values are dependent on a lighting angle of the raw image, with the lighting angle, at the time of the production of the raw image, is the angle between an optical axis of a lighting unit for the illumination of an observation surface and a surface normal of the observation surface.

9. A method in accordance with claim 1, wherein the correction values are dependent on the reflection properties of an observation surface.

10. A method in accordance with claim 1, wherein the correction values used for the intensity corrections are determined by at least one teaching process.

11. A method in accordance with claim 1, wherein different offset values that are independent of one of the line coordinates and column coordinates are added to the intensity values of the picture elements additionally at at least one of before and after the intensity corrections in the intensity matching.

12. A method in accordance with claim 11, wherein the offset values added to the intensity values are determined by at least one teaching process.

13. A method in accordance with claim 1, wherein at least one of the correction values and the offset values are selected such that a resulting correction error is minimal.

14. A method in accordance with claim 1, wherein intensity matching is repeated for so long and at least one of the correction values and the offset values are changed iteratively in this process until the correction error is minimal.

15. A method in accordance with claim 1, wherein a plurality of intensity matching processes are applied in parallel with respectively different correction value sets, which have at least partly differing correction values, and that correction value set is selected at which the correction error is minimal.

16. A method in accordance with claim 1, wherein at least one further intensity correction is carried out at at least some of the picture elements after the intensity matching.

17. A method for the correction of the brightness of a raw image generated by a sensor matrix, comprising:

executing an intensity matching at picture elements defined by a line coordinate and a column coordinate and at least one intensity value, wherein intensity values of the to be corrected picture elements are corrected using two intensity corrections that are independent of one another, the correction depending on the line coordinate, on the one hand, and depending on the column coordinate of the individual picture elements, on the other hand, wherein the intensity matching includes providing one of a product and a sum based on a respective intensity value, a correction value dependent on the line coordinate and a correction value dependent on the column coordinate, and wherein a correction error is determined by a comparison of the correction values with correction reference values of a predetermined optimized correction reference matrix.

18. An optoelectronic sensor, comprising:

a sensor matrix;

an optical receiving system; and a correction device for correcting of a brightness of a raw image generated by the sensor matrix, in which an intensity matching is carried out at picture elements defined by a line coordinate and a column coordinate and at least one intensity value, wherein the correction device is suitable for applying at least two intensity corrections that are independent of one another on the intensity values of the to be corrected picture elements, with the one intensity correction only being able to be carried out based on the line coordinate and the other intensity only being able to be carried out based on the column coordinate of individual picture elements, wherein the correction device generates one of a product and a sum based on a respective intensity value, a correction value dependent on the line coordinate and a correction value dependent on the column coordinate, and wherein the correction device determines a correction error by a comparison of a first image chanced by the intensity matching with a second image corrected by an optimized reference correction, with both images being derived from a common raw image.

19. An optoelectronic sensor, comprising:

a sensor matrix;

an optical receiving system; and a correction device for correcting of a brightness of a raw image generated by the sensor matrix, in which an intensity matching is carried out at picture elements defined by a line coordinate and a column coordinate and at least one intensity value, wherein the correction device is suitable for applying at least two intensity corrections that are independent of one another on the intensity values of the to be corrected picture elements, with the one intensity correction only being able to be carried out based on the line coordinate and the other intensity only being able to be carried out based on the column coordinate of individual picture elements, wherein the correction device generates one of a product and a sum based on a respective intensity value, a correction value dependent on the line coordinate and a correction value dependent on the column coordinate, and wherein the correction device determines a correction error by a comparison of the correction values with correction reference values of a predetermined optimized correction reference matrix.

* * * * *

UNITED STATES PATENT AND TRADEMARK OFFICE
CERTIFICATE OF CORRECTION

PATENT NO. : 7,714,914 B2
APPLICATION NO. : 11/649374
DATED : May 11, 2010
INVENTOR(S) : Reichenbach et al.

It is certified that error appears in the above-identified patent and that said Letters Patent is hereby corrected as shown below:

Column 10, Line 2  Delete "chanced" and insert --changed--
Column 12, Line 5  Delete "chanced" and insert --changed--

Signed and Sealed this

Twenty-fourth Day of August, 2010

David J. Kappos
*Director of the United States Patent and Trademark Office*